US011566708B2

(12) United States Patent
Keeney-Ritchie et al.

(10) Patent No.: US 11,566,708 B2
(45) Date of Patent: Jan. 31, 2023

(54) APPARATUS AND METHOD FOR DECREASING FLOW NOISE IN RING-TYPE JOINTS

(71) Applicant: Micro Motion, Inc., Boulder, CO (US)

(72) Inventors: Miles Keeney-Ritchie, Lafayette, CO (US); David Kuhny, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 189 days.

(21) Appl. No.: 16/617,681

(22) PCT Filed: Jun. 15, 2017

(86) PCT No.: PCT/US2017/037655
§ 371 (c)(1),
(2) Date: Nov. 27, 2019

(87) PCT Pub. No.: WO2018/231235
PCT Pub. Date: Dec. 20, 2018

(65) Prior Publication Data
US 2020/0124176 A1    Apr. 23, 2020

(51) Int. Cl.
*F16J 15/12*    (2006.01)
*F16L 23/20*    (2006.01)
*F16J 15/06*    (2006.01)
*F16L 23/18*    (2006.01)

(52) U.S. Cl.
CPC ............ *F16J 15/127* (2013.01); *F16J 15/061* (2013.01); *F16L 23/20* (2013.01); *F16L 23/18* (2013.01)

(58) Field of Classification Search
CPC .......... F16J 15/061; F16J 15/127; F16L 23/18; F16L 23/20
See application file for complete search history.

(56) References Cited

U.S. PATENT DOCUMENTS 2,291,709 A * 8/1942 Goetze ................... F16L 23/20
285/336
4,168,852 A * 9/1979 Ahlstone ............... F16L 23/003
277/609
4,168,853 A * 9/1979 Ahlstone ............... F16L 23/003
277/609

(Continued)

FOREIGN PATENT DOCUMENTS

EP    3379114 A1    9/2018
FR    2708983 A1    2/1995
(Continued)

*Primary Examiner* — Nicholas L Foster
(74) *Attorney, Agent, or Firm* — The Ollila Law Group LLC

(57) ABSTRACT

A gasket assembly is provided having a ring seal (100) and a ring joint gasket (12). The ring seal (100) has an annular sealing body (102) and an annular outer seal portion (106) disposed on and defining an outer edge of the annular sealing body (102). An annular inner seal portion (108) is disposed on and defines an inner edge of the annular sealing body (102). A central bore (104) is defined by an annular surface (110) of the annular inner seal portion (108). The ring joint gasket (12) has an inner surface (13) that engages the annular outer seal portion (106) of the ring seal (100), wherein the ring joint gasket is insertable into a flange of a ring-type joint.

10 Claims, 6 Drawing Sheets

(56) References Cited

U.S. PATENT DOCUMENTS

| | | | | |
|---|---|---|---|---|
| 4,188,037 A | * | 2/1980 | Abbes | F16J 15/002 277/317 |
| 4,272,109 A | * | 6/1981 | Ahlstone | E21B 17/085 277/609 |
| 4,294,477 A | * | 10/1981 | Ahlstone | F16L 23/16 277/609 |
| 4,502,837 A | | 3/1985 | Blair et al. | |
| 5,570,911 A | * | 11/1996 | Galle | F16L 23/04 285/364 |
| 6,299,216 B1 | * | 10/2001 | Thompson | F16L 23/167 285/93 |
| 6,454,316 B1 | * | 9/2002 | Aaron, III | F16L 23/003 285/339 |
| 6,543,120 B2 | * | 4/2003 | Aaron, III | F16L 23/003 285/379 |
| 7,004,470 B2 | * | 2/2006 | Hystad | G01M 3/2853 277/317 |
| 9,103,457 B2 | * | 8/2015 | Holliday | F16L 23/167 |
| 9,410,831 B2 | * | 8/2016 | Smith | F16J 15/3212 |
| 2004/0160018 A1 | * | 8/2004 | Dupont | F16J 15/104 277/628 |
| 2009/0295155 A1 | * | 12/2009 | Keller-Staub | F16L 23/18 285/365 |
| 2011/0210545 A1 | * | 9/2011 | Kesler | F16L 41/086 285/336 |
| 2011/0316239 A1 | * | 12/2011 | Holliday | F16L 23/18 277/602 |
| 2016/0084690 A1 | * | 3/2016 | Smith | F16J 15/3212 73/861.12 |
| 2016/0138172 A1 | * | 5/2016 | Al-Buraiki | C23F 13/10 204/196.15 |
| 2017/0321831 A1 | | 11/2017 | Nahrwold et al. | |

FOREIGN PATENT DOCUMENTS

| | | |
|---|---|---|
| JP | S58045465 U | 3/1983 |
| JP | 58180872 A | 10/1983 |
| JP | S59147981 U | 10/1984 |
| JP | 2002364751 A | 12/2002 |
| JP | 2006132662 A | 5/2006 |
| WO | 03016756 A2 | 2/2003 |
| WO | 2008056743 A1 | 5/2008 |
| WO | 2013153672 A1 | 10/2013 |

\* cited by examiner

APPARATUS AND METHOD FOR DECREASING FLOW NOISE IN RING-TYPE JOINTS

TECHNICAL FIELD

The present invention relates to fluid flow connectors, and more particularly to a ring type joint that reduces turbulent fluid flow.

BACKGROUND OF THE INVENTION

Ring joints were initially developed for high pressure/temperature applications found in the petroleum industry for use in the oil field on drilling and completion equipment. However, today this style of joint is found on valves and pipework assemblies, along with some high integrity pressure vessel joints. Ring joints are often used in high pressure applications, and often for gas flow applications and are particularly well suited for corrosive environments, such as in ships and offshore oil platforms.

This type of connection uses a ring (often stainless steel) to seal against a groove in each flange. They are precision-engineered components designed to be used in conjunction with precision-machined flanges. Unfortunately, this style of seal creates a small gap between the flange faces which increases turbulence as the process fluid flows across it. With a large enough velocity the annular cavity resonates and introduces a large amount of flow noise into flow paths. This is especially prevalent in gas flow. In ring joint applications related to precision metering, both accuracy and repeatability may be adversely affected.

According to embodiments, a ring joint spacer is provided that is insertable between flange faces inside a ring joint. This spacer reduces turbulence in fluid flow, and an advance in the art is achieved.

SUMMARY OF THE INVENTION

A gasket assembly is provided according to an embodiment. The gasket assembly comprises a ring seal. The ring seal comprises an annular sealing body and an annular outer seal portion disposed on and defining an outer edge of the annular sealing body. An annular inner seal portion is disposed on and defines an inner edge of the annular sealing body. A central bore is defined by an annular surface of the annular inner seal portion. A ring joint gasket is provided having an inner surface that engages the annular outer seal portion of the ring seal, wherein the ring joint gasket is insertable into a flange of a ring-type joint.

A method of forming a gasket assembly is provided according to an embodiment. The method comprises the steps of providing a ring joint gasket that has an inner surface. A ring seal is inserted into the ring joint gasket, wherein the ring seal comprises an annular sealing body, an annular outer seal portion disposed on and defining an outer edge of the annular sealing body, an annular inner seal portion disposed on and defining an inner edge of the annular sealing body, and a central bore defined by an annular surface of the annular inner seal portion. The inner surface of the ring joint gasket engages the annular outer seal portion of the ring seal.

Aspects

According to an aspect, a gasket assembly comprises a ring seal comprising: an annular sealing body, an annular outer seal portion disposed on and defining an outer edge of the annular sealing body, an annular inner seal portion disposed on and defining an inner edge of the annular sealing body, a central bore defined by an annular surface of the annular inner seal portion, and a ring joint gasket having an inner surface that engages the annular outer seal portion of the ring seal, wherein the ring joint gasket is insertable into a flange of a ring-type joint.

Preferably, the ring joint gasket comprises a BX, RX, SRX, SBX, Bridgeman, delta, or lens type gasket.

Preferably, the annular sealing body comprises a width less than a width of at least one of the annular outer seal portion and annular inner seal portion.

Preferably, the annular sealing body comprises a width less than a width of at both the annular outer seal portion and the annular inner seal portion.

Preferably, the annular inner seal portion comprises a frustoconical cross-section.

Preferably, a frustum comprises an angle of about 45° with regard to the annular surface.

Preferably, a frustum comprises an angle of between about 10° and 80° with regard to the annular surface.

According to an aspect, a method of forming a gasket assembly comprises the steps of: providing a ring joint gasket having an inner surface and inserting a ring seal into the ring joint gasket, wherein the ring seal comprises: an annular sealing body, an annular outer seal portion disposed on and defining an outer edge of the annular sealing body, an annular inner seal portion disposed on and defining an inner edge of the annular sealing body, and a central bore defined by an annular surface of the annular inner seal portion. The inner surface of the ring joint engages a gasket with the annular outer seal portion of the ring seal.

Preferably, the method comprises the step of inserting the ring joint gasket into a flange of a ring-type joint.

Preferably, ring joint gasket comprises a BX, RX, SRX, SBX, Bridgeman, delta, or lens type gasket.

Preferably, the method comprises the step of forming the annular sealing body with a width less than a width of at least one of the annular outer seal portion and annular inner seal portion.

Preferably, the method comprises the step of forming the annular sealing body with a width less than a width of at both the annular outer seal portion and the annular inner seal portion.

Preferably, the method comprises the step of forming the annular inner seal portion to comprise a frustoconical cross-section.

Preferably, the method comprises the step of forming a frustum to comprise an angle of about 45° with regard to the annular surface.

Preferably, the method comprises the step of forming a frustum to comprise an angle of between about 10° and 80° with regard to the annular surface.

Preferably, the method comprises the step of inserting the ring joint gasket into a flowmeter flange.

Preferably, the method comprises the step of compressing the ring seal in an annular gap defined by ring gasket and flange.

Preferably, the ring seal fully fills the annular gap.

DETAILED DESCRIPTION OF THE INVENTION

FIGS. 3-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
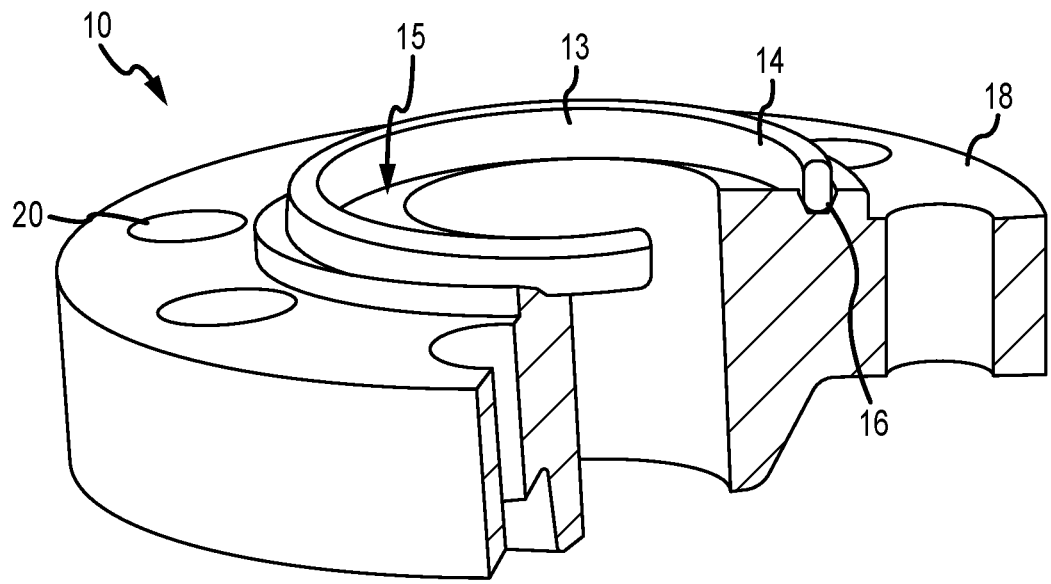
FIG. 1 illustrates a cross-section of a prior art ring joint component.
Figure 2:
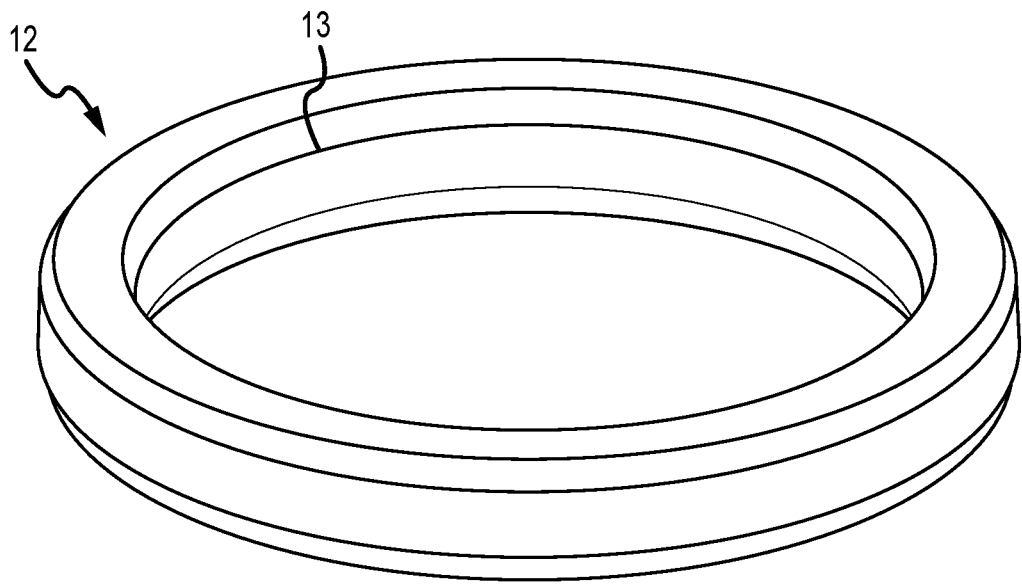
FIG. 2 illustrates a prior art octagonal ring joint gasket.

FIG. 1 illustrates a portion of a prior art ring joint assembly 10, and FIG. 2 illustrates a prior art octagonal ring joint gasket 12. An oval style ring joint gasket 14 is installed in a groove 16 defined by the ring joint flange 18. An octagonal ring joint gasket 12 may be used instead of the oval style gasket 14, depending on the application. However, the ring joint flange 18 typically has a groove 16 configured to receive the particular type of ring joint gasket being used. Other styles of ring joint gasket are also known in the art such as delta, lens, and Bridgeman style gaskets, for example.

In practice, two ring joint flanges 18 are fastened to each other with mechanical fasteners (not shown) that pass through flange holes 20 defined by each ring joint flange 18. The ring joint gasket 12 fills and seals the groove 16 in each ring joint flange 18. As the fasteners are tightened, the ring joint gasket 12 is pressed into the groove 16 and deforms to seal the flange-to-flange junction. Depending on joint geometry and material selection, pressure in the process line may promote ring joint gasket 12 deformation and acting as a self-energizing seal. Ideally, the hardness of the ring joint gasket 12 should be less than the hardness of the ring joint flanges 18 to prevent flange deformation. The high stresses provide a tight seal for sealing high pressure fluid, such as oil and gas.

Ring joint gaskets are commonly made from either a low carbon or low alloy steel that lacks corrosion resistance, or a corrosion resistant steel such as stainless steel or nickel based corrosion resistant alloy.

Figure 3:
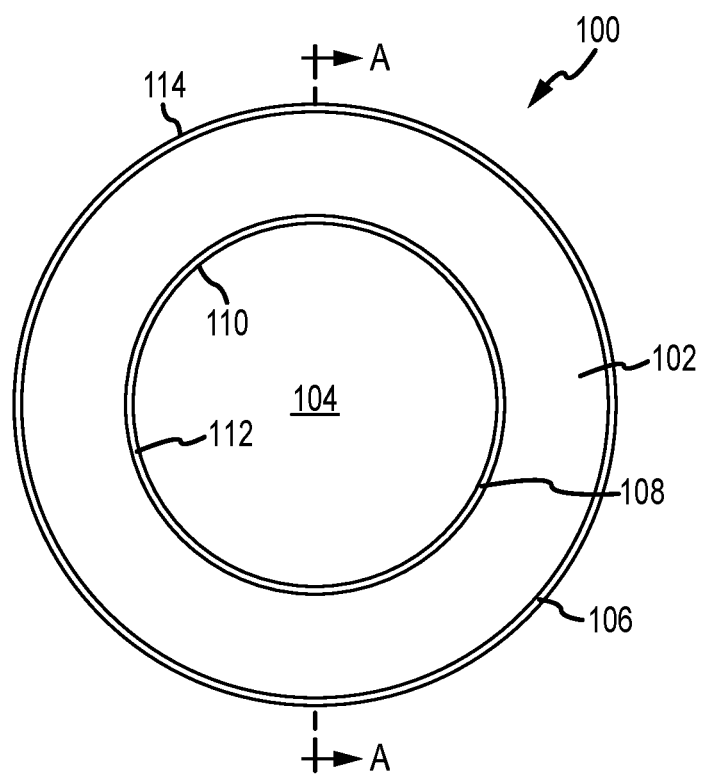
FIG. 3 illustrates a ring seal according to an embodiment.
Figure 4:
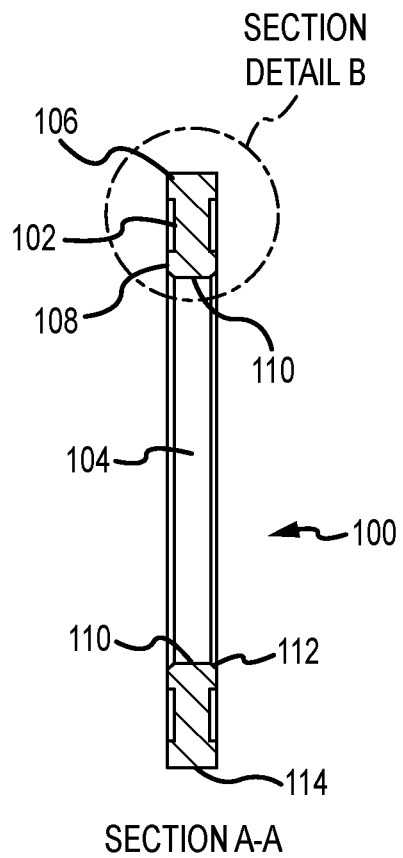
FIG. 4 is a cross-sectional view of the ring seal of FIG. 3.
Figure 5:
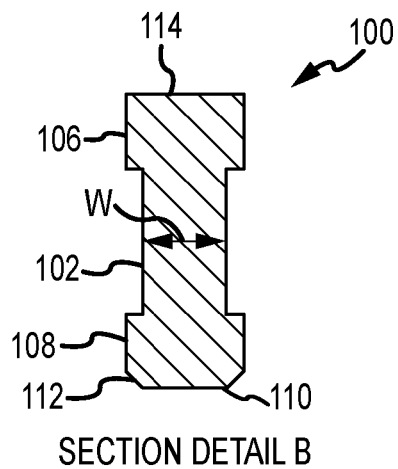
FIG. 5 is a magnified view of the spacer of FIGS. 3 and 4.

FIGS. 3-5 illustrate a ring seal 100 according to an embodiment. The ring seal 100 comprises an annular sealing body 102 having a central bore 104 therein. The ring seal 100 includes an annular outer seal portion 106 and an annular inner seal portion 108. In an embodiment, the ring seal 100 is made of a semi-compliant material, such as polytetrafluoroethylene for example, without limitation. Rubbers, plastics, thermoplastic compounds, and polymers of high or low compliance are also contemplated. Furthermore, metals, ceramics, glass, and composite materials are also contemplated. In embodiments using metals, the ring seal 100 is preferably formed from metals that are softer than those used in the ring joint assembly 10, such as alloys of silver, tin, lead, and indium, for example without limitation.

Figure 6:
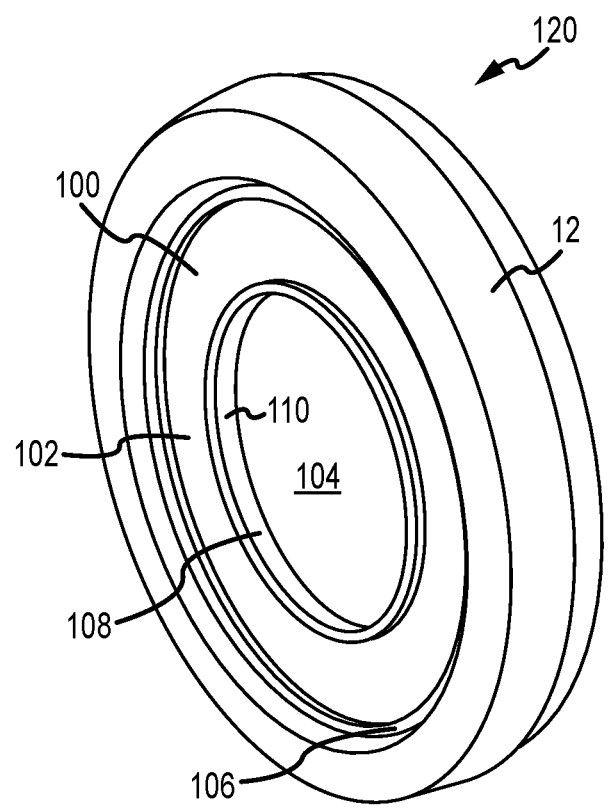
FIG. 6 illustrates a ring seal according to an embodiment installed in a ring joint gasket.

Turning to FIG. 6, and with continued reference to FIGS. 1-5, it will be clear that the ring seal 100 is configured to be insertable into an annulus of a ring joint gasket to form a gasket assembly 120, such as the prior art ring joint gaskets 12, 14 of FIGS. 1 and 2, for example without limitation. Although octagonal 12 and oval 14 ring joint gaskets are illustrated, the ring seal may be configured to be insertable in BX, RX, SRX, SBX, Bridgeman, delta, lens, and any other ring joint gasket style or configuration known in the art.

When two ring joint flanges 18 are mated, the ring joint flanges 18 and the inner surface 13 of the ring gasket define a cavity or annular gap 15 (See FIGS. 1 and 2). This annular gap 15 between the flange faces increases turbulence as a process fluid flows across it. With a large enough velocity, especially in gas flows, the annular gap 15 resonates and introduces a large amount of flow noise into the conduits (not shown) to which the a ring joint assembly 10 is attached.

To reduce the turbulence caused by process fluid flowing across the annular gap 15 of a ring joint assembly 10, the ring seal 100 is inserted into the ring joint gasket 12, 14 to mate with an inner surface 13 thereof. This is installed in the joint assembly 10 as a sub-assembly, as illustrated in FIG. 6. Since, in most embodiments, the ring seal 100 is semi-compliant, upon compression of the ring joint flanges 18, the ring seal 100 is slightly compressed into the annular gap 15, which prevents rattling or resonating of the ring gasket and also fully fills the annular gap 15.

Turning again to FIGS. 3-5, the inner seal portion 108 forms the boundary of the central bore 104. The outer seal portion 106 defines an annular surface 110. The annular surface 110, in an embodiment, has a frustoconical cross section (See FIG. 5 for cross-sectional detail). However, curved, triangular, and polygonal cross sections are also contemplated in embodiments. Furthermore, frustoconical and triangular sections may also comprise rounded or "soft" edges. "Hard" or angled edges are illustrated, as an example. The angle of the frustum 112 with respect to the annular surface 110 is, in an embodiment, approximately 45°. However, a range of angles from about 10° to about 80° is contemplated. In another embodiment, a rectilinear profile is contemplated, and thus the angle would be 90°.

A seating face 114 that engages the ring joint gasket 12, 14 may be flat, as illustrated. In other embodiments the seating face 114 may be convex, concave, angular, faceted, ribbed, ridged, or otherwise shaped to engage the contours of the ring joint gasket into which it is configured to be installed.

Figure 7:
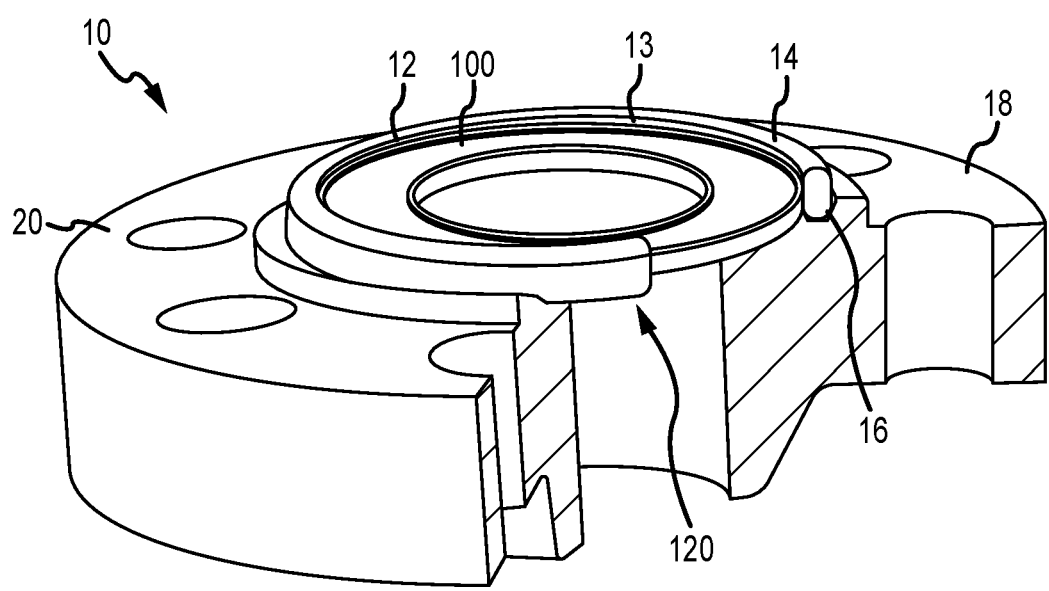
FIG. 7 illustrates a ring seal and ring joint gasket installed in a ring joint component.

The annular sealing body 102 is thinner in cross-sectional width, W, (FIG. 5) than the width of either the outer seal portion 106 or the annular inner seal portion 108 or both the outer seal portion 106 and the annular inner seal portion 108. This feature is provided so to allow the inner and/or outer seal portions 106, 108 to contact the flange faces 18 and to preferably deform slightly without forcing ring seal 100 material to protrude into the flow stream. Although deformation upon installation is preferable, it is not strictly necessary for all embodiments. The volume of the ring seal 100 may, in some embodiments, be sufficient to substantially fill the volume of the annular gap 15 when the surfaces of the ring joint assembly 10 are engaged by the ring seal 100. FIG. 7 illustrates the ring seal 100 installed in a joint assembly 10.

Figure 8:
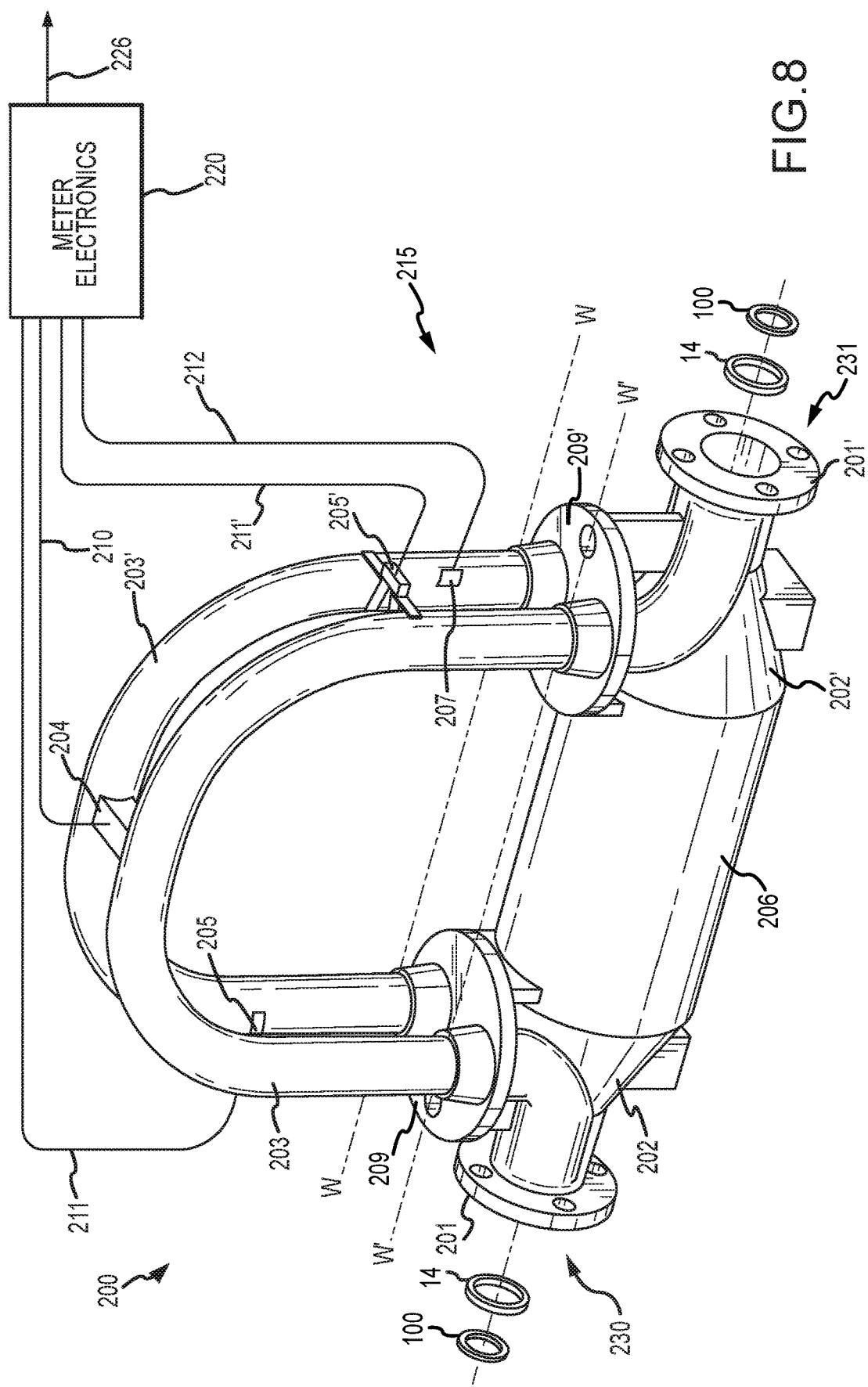
FIG. 8 illustrates an exploded view of a ring seal according to an embodiment installed in a flowmeter.

FIG. 8 illustrates a flow meter 200 which can be any vibrating meter, such as a Coriolis flowmeter or densitometer, for example without limitation. The flowmeter 200 comprises a sensor assembly 215 and meter electronics 220. The sensor assembly 215 may respond to mass flow rate and density of a process material. Meter electronics 220 are connected to the sensor assembly 215 via leads 210, 211, 211', 212 to provide density, mass flow rate, and temperature information over path 226, as well as other information. The sensor assembly 215 includes flanges 201 and 201', a pair of manifolds 202 and 202', a pair of parallel conduits 203 (first conduit) and 203' (second conduit), a driver 204, a temperature sensor 207 such as a resistive temperature detector (RTD), and a pair of pickoffs 205 and 205', such as magnet/coil pickoffs, strain gages, optical sensors, or any other pickoff known in the art.

When flanges 201 and 201' are connected to a process line (not shown) that carries the process material that is being measured, material enters a first end 230 of the flowmeter 200 through a first orifice (not visible in the view of FIG. 8) in flange 201 and is conducted through the manifold 202. Within the manifold 202, the material is divided and routed through conduits 203 and 203'. Upon exiting conduits 203 and 203', the process material is recombined in a single stream within manifold 202' and is thereafter routed to exit a second end 231 connected by flange 201' to the process line (not shown).

Conduits 203 and 203' are selected and appropriately mounted to the conduit mounting blocks 209 and 209' so as to have substantially the same mass distribution, moments of inertia, and Young's modulus about bending axes W-W and W'-W', respectively. Inasmuch as the Young's modulus of the conduits 203, 203' changes with temperature, and this change affects the calculation of flow and density, a temperature sensor 207 is mounted to a conduit 203, 203' to continuously measure the temperature of the conduit. The temperature of the conduit, and hence the voltage appearing across the temperature sensor 207 for a given current passing therethrough, is governed primarily by the temperature of the material passing through the conduit. The temperature-dependent voltage appearing across the temperature sensor 207 is used in a well-known method by meter electronics 220 to compensate for the change in elastic modulus of conduits 203, 203' due to any changes in conduit 203, 203' temperature. The temperature sensor is connected to meter electronics 220.

Both conduits 203, 203' are driven by driver 204 in opposite directions about their respective bending axes W and W' at what is termed the first out-of-phase bending mode of the flowmeter. This driver 204 may comprise any one of many well-known arrangements, such as a magnet mounted to conduit 203' and an opposing coil mounted to conduit 203, through which an alternating current is passed for vibrating both conduits. A suitable drive signal is applied by meter electronics 220, via lead 210, to the driver 204. It should be appreciated that while the discussion is directed towards two conduits 203, 203', in other embodiments, only a single conduit may be provided or more than two conduits may be provided. It is also within the scope of the present invention to produce multiple drive signals for multiple drivers.

Meter electronics 220 receive the temperature signal, and the left and right velocity signals appearing on leads 211 and 211', respectively. Meter electronics 220 produce the drive signal appearing on lead 210 to driver 204 and vibrate conduits 203, 203'. Meter electronics 220 process the left and right velocity signals and the temperature signal to compute the mass flow rate and the density of the material passing through sensor assembly 215. This information, along with other information, is applied by meter electronics 220 over path 226 to utilization means. An explanation of the circuitry of the meter electronics 220 is not needed to understand the present invention and is omitted for brevity of this description. It should be appreciated that the description of FIG. 8 is provided merely as an example of the operation of one possible vibrating meter and is not intended to limit the teaching of the present invention. A Coriolis flowmeter structure is described although it will be apparent to those skilled in the art that the present invention could be practiced on a vibrating tube densitometer. In fact, the present invention may be utilized in pipelines, conduits, flanges, of all sizes, with or without means for measuring mass flow, density, etc. The present invention may be practiced in the absence of any flowmeter 200 as well.

The ring joint gaskets 14 illustrated are installed into flanges 201, 201', and ring seals 100 are inserted into the annulus of each ring joint gasket 14. Complimentary process lines flanges (not shown) are attached to each flange 201, 201' so as to attach the flow meter 200 to process lines (not shown). Again, although an oval 14 ring joint gasket is illustrated, the ring seal may be configured to be insertable in BX, RX, SRX, SBX, Bridgeman, delta, lens, and any other ring joint gasket style or configuration known in the art.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vibrating systems, and not just to the embodiments described above and shown in the accompanying figures. Accordingly, the scope of the invention should be determined from the following claims.

We claim:
1. A gasket assembly (120), comprising:
   a semi-compliant ring seal (100) comprising:
   an annular sealing body (102) comprising an I-shaped cross section;
   an annular outer seal portion (106) disposed on and defining an outer edge of the annular sealing body (102);
   an annular inner seal portion (108) disposed on and defining an inner edge of the annular sealing body (102); and
   a frustum of a frustoconical cross-section of the inner seal portion is directly connected to an annular surface-defining the central bore and axially faces towards the central bore; and
   a ring joint gasket (12) having an inner surface (13) that engages the annular outer seal portion (106) of the ring seal (100), wherein the ring joint gasket is insertable into a flange of a ring-type joint, and wherein the ring joint gasket comprises an overall axial height that is substantially larger than an overall axial height of the ring seal.

2. The gasket assembly (120) of claim 1, wherein the annular sealing body (102) comprises a width (W) less than a width of at least one of the annular outer seal portion (106) and annular inner seal portion (108).

3. The gasket assembly (120) of claim 1, wherein the annular sealing body (102) comprises a width (W) less than a width of both the annular outer seal portion (106) and the annular inner seal portion (108).

4. A method of forming a gasket assembly, comprising the steps of:
   providing a ring joint gasket having an inner surface;
   inserting a semi-compliant ring seal into the ring joint gasket, wherein the ring seal comprises:
      an annular sealing body comprising an I-shaped cross section;
      an annular outer seal portion disposed on and defining an outer edge of the annular sealing body;
      an annular inner seal portion disposed on and defining an inner edge of the annular sealing body; and
      a frustum of a frustoconical cross-section of the inner seal portion is directly connected to an annular surface defining the central bore and axially faces towards the central bore; and
   engaging the inner surface of the ring joint gasket with the annular outer seal portion of the ring seal, wherein the ring joint gasket comprises an overall axial height that is substantially larger than an overall axial height of the ring seal.

5. The method of forming a gasket assembly of claim 4, comprising the step of:
   inserting the ring joint gasket into a flange of a ring-type joint.

6. The method of forming a gasket assembly of claim 4, comprising the step of forming the annular sealing body with a width less than a width of at least one of the annular outer seal portion and annular inner seal portion.

7. The method of forming a gasket assembly of claim 4, comprising the steps of forming the annular sealing body with a width less than a width of both the annular outer seal portion and the annular inner seal portion.

8. The method of forming a gasket assembly of claim 4, comprising the step of inserting the ring joint gasket into a flowmeter flange.

9. The method of forming a gasket assembly of claim 4, comprising the step of compressing the ring seal in an annular gap defined by the ring joint gasket and a flange.

10. The method of forming a gasket assembly of claim 9, wherein the ring seal substantially fills the annular gap.

* * * * *